United States Patent
Rossi et al.

(10) Patent No.: US 7,926,038 B2
(45) Date of Patent: Apr. 12, 2011

(54) METHOD, SYSTEM AND COMPUTER PROGRAM FOR TESTING A COMMAND LINE INTERFACE OF A SOFTWARE PRODUCT

(75) Inventors: Riccardo Rossi, Rome (IT); Gianluca Seghetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 11/558,627

(22) Filed: Nov. 10, 2006

(65) Prior Publication Data
US 2007/0174713 A1    Jul. 26, 2007

(30) Foreign Application Priority Data
Nov. 21, 2005   (EP) .................................. 05111023

(51) Int. Cl.
*G06F 9/44*      (2006.01)
(52) U.S. Cl. ........... 717/126; 717/124; 717/125; 714/38
(58) Field of Classification Search .................. 717/124, 717/125; 714/38
See application file for complete search history.

(56) References Cited

U.S. PATENT DOCUMENTS

| | | | | |
|---|---|---|---|---|
| 5,701,408 A | * | 12/1997 | Cornell et al. ................... | 714/38 |
| 5,708,774 A | * | 1/1998 | Boden .............................. | 714/38 |
| 5,758,156 A | * | 5/1998 | Kano .............................. | 713/100 |
| 5,831,995 A | * | 11/1998 | Brown et al. ................... | 714/738 |
| 6,189,031 B1 | * | 2/2001 | Badger et al. ................... | 709/224 |
| 6,230,114 B1 | * | 5/2001 | Hellestrand et al. ............ | 703/13 |
| 6,950,962 B2 | * | 9/2005 | Mathias et al. .................. | 714/25 |
| 2003/0033085 A1 | * | 2/2003 | Sanchez et al. ................... | 702/1 |

OTHER PUBLICATIONS

Hermansson et al. "A Test Tool for Command Line Interface Regression Test", Jun. 3, 2004, ACM, p. 1-84.*

* cited by examiner

*Primary Examiner* — Wei Y Zhen
*Assistant Examiner* — Phillip H Nguyen
(74) *Attorney, Agent, or Firm* — Garg Law Firm, PLLC; Rakesh Garg; Jeffrey S. LaBaw

(57) ABSTRACT

A solution for facilitating the test of a command line interface (CLI) of a software product is proposed. A first phase of a process generates a scenarios matrix. Each command of the CLI is defined with its arguments and the corresponding properties; the test activity is defined by specifying a desired accuracy level of the test process. The scenarios matrix can then be generated automatically, by selecting (according to the desired accuracy level) predefined rules specifying happy paths and errors cases for each property. A second phase generates corresponding test cases. An expected result is associated with each test scenario in the respective matrix. This allows creating a test document for the manual execution of the test process and/or a bucket for its automatic execution by an automation tool.

17 Claims, 4 Drawing Sheets

METHOD, SYSTEM AND COMPUTER PROGRAM FOR TESTING A COMMAND LINE INTERFACE OF A SOFTWARE PRODUCT

FIELD OF THE INVENTION

The present invention relates to the information technology field. More specifically, the present invention relates to the test of a command line interface of a software product.

BACKGROUND ART

The test of software products (to verify their correctness, completeness and quality) is a very critical process. The execution of a test process generally requires performing selected operations and then verifying whether the software product behaves as expected. For this purpose, each tester interacts with the software product by means of a corresponding interface, which may be of the command line type or of the graphical type; particularly, in a Command Line Interface (CLI) the commands with respective arguments are provided in a textual format (from a keyboard or a script file), while in a Graphical User Interface (GUI) the commands are issued by manipulating images on a monitor with a pointer (of a mouse). The CLI is very powerful and allows performing certain operations more quickly; generally, the CLI is used by expert end-users (such as in programming environments). Conversely, the GUI is user-friendly and simpler; therefore, the GUI is well suited for less skilled end-users (such as in secretarial environments).

The design of the test process generally starts with the definition of its coverage. A technique commonly used for this purpose consists of creating a scenarios matrix; this matrix lists a series of test scenarios, each one for verifying a selected feature of the software product. Considering in particular the CLI, the scenarios matrix includes the invocation of the commands to be tested with different values of their arguments. For example, the commands are exercised with all the required arguments, with some arguments missing, or with the arguments in the right/wrong order; likewise, the arguments are selected in the allowable ranges, at their boundaries, outside the allowable ranges, with right/wrong formats, and the like.

Starting from the scenarios matrix, a series of corresponding test cases is then defined. Each test case indicates the execution of a selected command with the desired values of the arguments, followed by the verification of its expected result; for example, this requires specifying for each test scenario an output message (such as a return code and/or an explanation text), which should be received from the software product. The test cases are described in prose in a document to be used for executing them manually. Alternatively, it is also possible to program an automation tool accordingly so as to cause the automatic execution of the test cases.

In any case, the management of the test process is substantially a manual task. Indeed, all the activities relating to the design of the scenarios matrix and of the test cases remain in charge of a test manager. Very often, the execution of the test cases as well is performed manually; however, even when an automation tool is available, its programming requires a heavy human intervention.

The problem is particular acute in large software products. Moreover, the same operations must be repeated at any new version, release or service level of the software product. In this respect, it should be noted that the test of the software product may be required at different levels of accuracy, from a basic level (when only the building of the software product has to be verified) to a high level (when each component thereof has to be verified).

In any case, the work required to design the test process is time consuming, repetitive and tedious; likewise, its execution is a long and boring activity. Moreover, the quality of the test process strongly depends on the skill of the test manager; therefore, the obtained results are not repeatable and prone to errors. The same document (which is intended to describe the test cases) is not well suited to convey and/or share the desired information, and does not allow an objective analysis of the test process.

All of the above adversely affects the cost and the quality of the test process; this hinders its extensive application, with a negative repercussion on the reliability of the software products.

SUMMARY OF THE INVENTION

The present invention provides a solution as set out in the independent claims. Advantageous embodiments of the invention are described in the dependent claims.

In principle, the invention proposes a solution that is aimed at facilitating the test process.

Particularly, an aspect of the invention provides a method for testing a command line interface of a software product. The method starts with the step of providing a definition of a set of (one or more) commands of the interface; each command requires a set of arguments (down to none), with each argument that has a set of (one or more) properties. Examples of those properties are a data type (such as number, string, or date) and/or other options (such required, optional or positional). The method also involves providing a definition of a set of (one or more) allowable conditions and non-allowable conditions for each property. Examples of those conditions are a right/wrong format, a required argument that is missing, and the like; preferably, the conditions of some properties are based on a formal specification of corresponding constraints (such as an acceptable range or pattern). The method continues by generating a set of (one or more) test scenarios (i.e., a scenarios matrix). The test scenarios include the invocation of the commands with their arguments that are assigned according to selected ones of the conditions. In a preferred embodiment, the selected conditions are determined as a function of a desired accuracy level; moreover, in the above-mentioned example this involves resolving the formal specification of each constraint into its actual value (included in the definition of the corresponding command). A set of test cases is now generated by associating an expected result to each test scenario. For example, it is possible to exploit an imported list of the output messages of the interface; in addition, it is also possible to indicate verification actions to the performed for checking the successful completion of the test scenario. The method ends by causing the execution of the test cases. In an embodiment of the invention, this result is achieved by generating an execution bucket for an automation tool; in addition or in alternative, it is possible to generate a test document for the manual execution of the test cases.

Another aspect of the invention proposes a computer program for performing this method.

A further aspect of the invention proposes a corresponding system.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
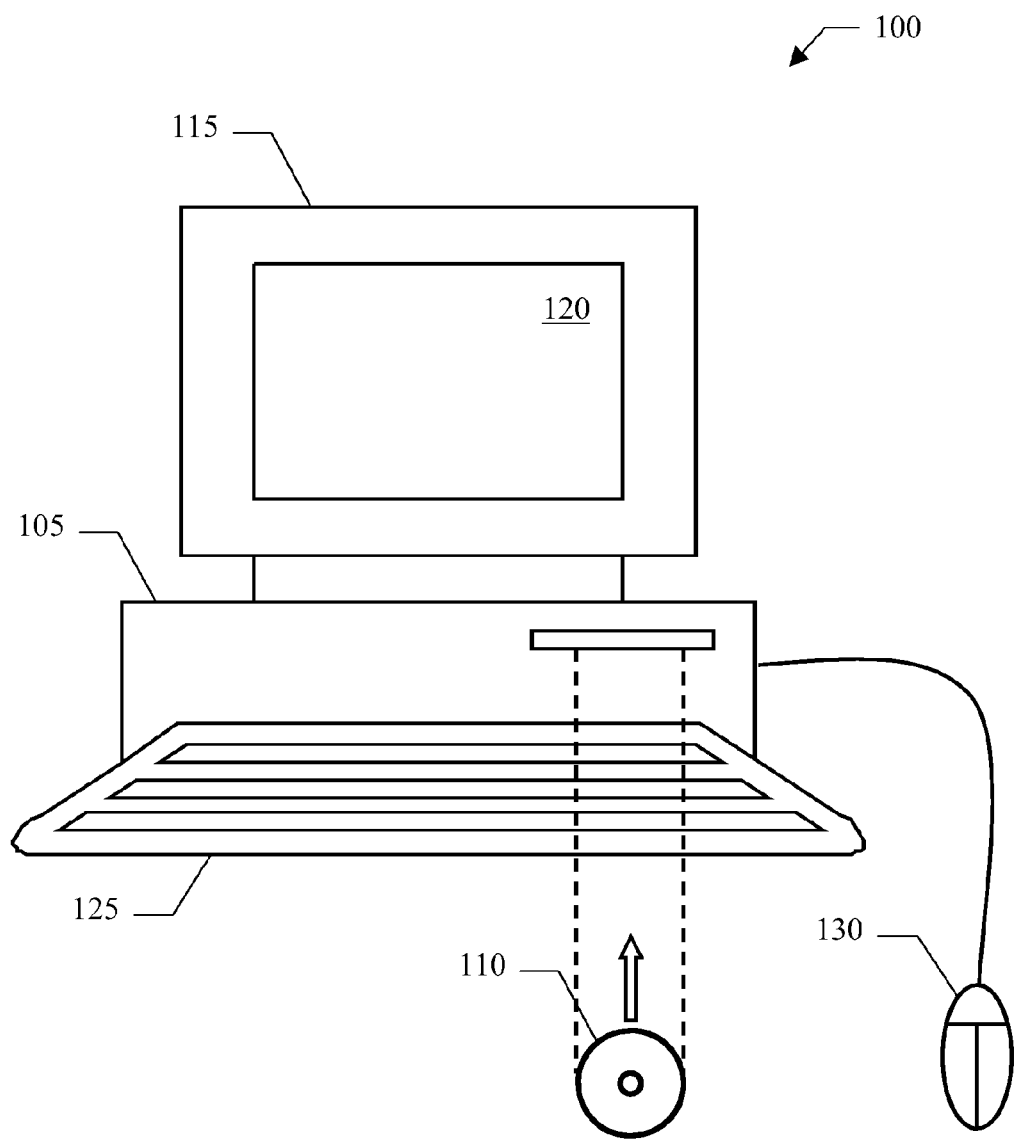
FIG. 1 is a pictorial representation of a computer in which the solution according to an embodiment of the invention can be implemented.

With reference in particular to FIG. 1, a computer 100 (for example, a PC) is shown. The computer 100 includes a central unit 105, which houses the electronic circuits controlling its operation (such as a microprocessor and a working memory). The computer 100 is also provided with a hard-disk and a drive for CD-ROMs 110. A monitor 115 is used to display images on a screen 120. Operation of the computer 100 is controlled by means of a keyboard 125 and a mouse 130, which are connected to the central unit 105 in a conventional manner.

The computer 100 may be used to test software products (either operating systems or application programs). More specifically, each software product provides a Command Line Interface (CLI) to end-users for accessing its services. In this case, the end-users interact with the software product through lines of textual commands; the commands are provided from the keyboard (in an interactive way) or from a script file (in a batch mode). In the first case, each end-user types a desired command in response to a prompt, and then submits it with an Enter key; in the latter case, the CLI directly executes a series of commands specified in the script file. As described in detail in the following, the solution according to an embodiment of the present invention provides a framework that allows automating (at least partially) the execution of such test process.

Figure 2:
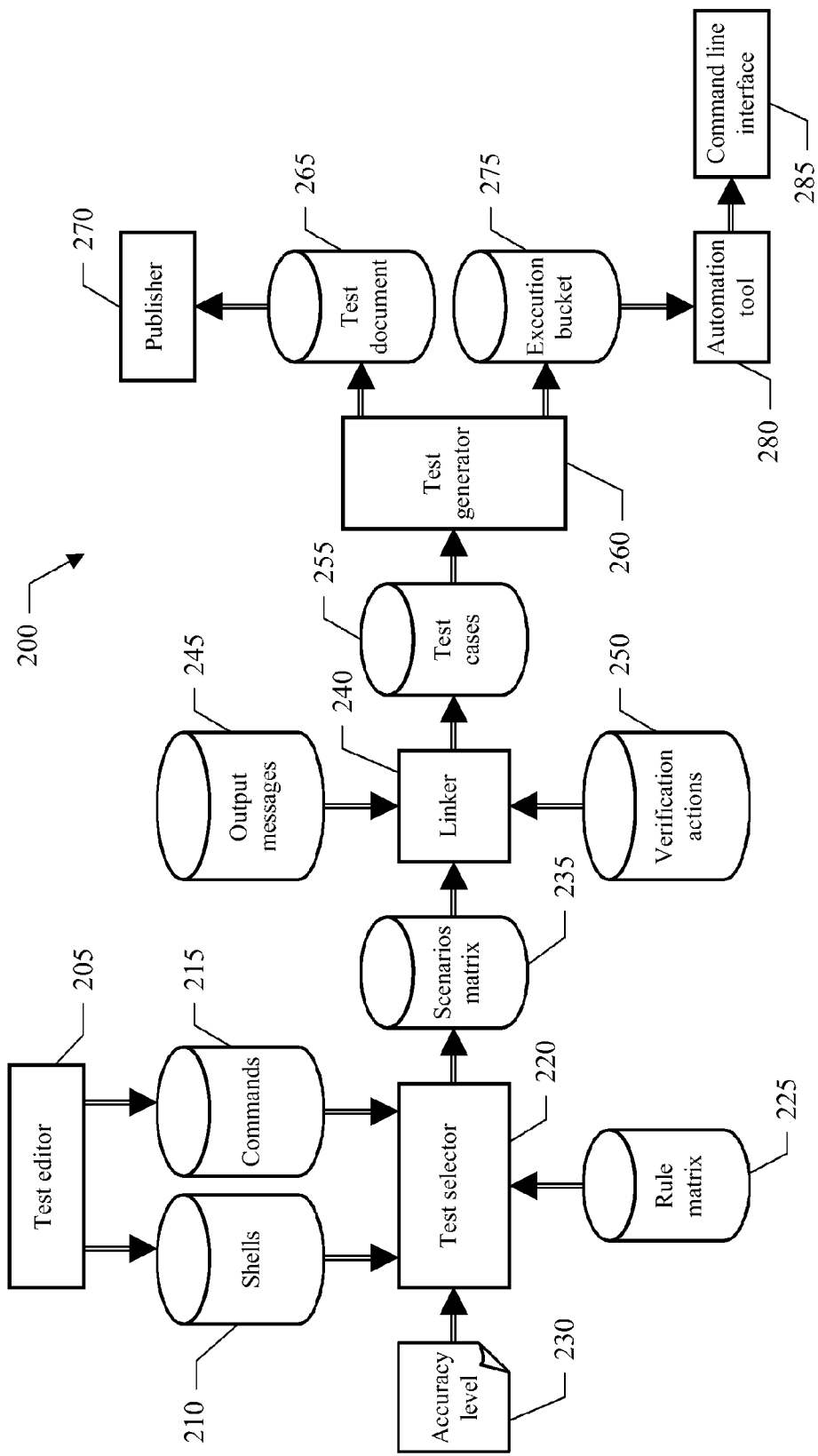
FIG. 2 shows the main software components that can be used to practice the solution according to an embodiment of the invention.

Moving now to FIG. 2, the main software components running on the computer for this purpose define a test management suite, which is denoted as a whole with the reference 200. The information (programs and data) is typically stored on the hard-disk and loaded (at least partially) into the working memory of the computer when the programs are running, together with an operating system and other application programs (not shown in the figure). The programs are initially installed onto the hard disk, for example, from CD-ROM.

Particularly, a test editor 205 is used to provide a definition of the CLI by a test manager.

More in detail, the test manager at first specifies a list of shells supporting the CLI. Each shell consists of an environment wherein the end-users can launch the commands of the CLI; examples of those shells are available in the MVS, VM, Unix, or DOS operating systems, and in the Tivoli Workload Scheduler (TWS), Tivoli Licensing Manager (TLM), Tivoli Configuration Manager (TCM), or MatLab application programs. The definitions of the shells (such as their names and access instructions) are stored into a corresponding repository 210.

For each shell, the test manager then specifies the commands of interest. Typically, a generic command has a syntax that is defined by a name and a series of arguments; the name indicates the desired operation, while the arguments (if any) indicate how this operation should be performed in the specific situation. Each argument is in turn defined by a series of properties specifying its format. For example, the properties include a data type of the argument (such as number, string, enumeration, date, time, file, and the like); moreover, the properties include other options (such as whether the argument is in-line, interactive or from-file, whether it is required or optional, whether it is positional, whether it can be identified by a flag, and the like). Typically, each argument has different constraints (such as acceptable range, patterns and/or option choices). The definitions of the commands (i.e., the shell, name, and arguments with their properties) are stored into a corresponding repository 215.

A test selector 220 is input the shell definitions 210 and the command definitions 215. Moreover, the test selector 220 accesses a rule matrix 225. For each possible property, the rule matrix 225 provides a list of allowable conditions (happy paths) and non-allowable conditions (error cases); some (allowable and non-allowable) conditions are based on a formal specification of the constraints of the corresponding property (i.e., without any actual value). An example of this rule matrix 225 is provided by the following table:

| Property | Allowable conditions | Non-allowable conditions |
|---|---|---|
| Number | In the range: (max − min)/2<br>Minimum<br>Maximum<br>Zero (if allowed)<br>Negative (if allowed)<br>Decimal with "."<br>(if allowed)<br>Decimal with ","<br>(if allowed) | Under minimum<br>Over maximum<br>Zero (if not allowed)<br>Negative (if not allowed)<br>Decimal with "."<br>(if not allowed)<br>Decimal with ","<br>(if not allowed)<br>String |
| String | Length in the range:<br>(max − min)/2<br>Minimum length<br>Maximum length<br>Lower case (if allowed)<br>Upper case (if allowed)<br>Not ASCII chars (if allowed)<br>Not alphabetic chars<br>(if allowed)<br>Empty (if allowed) | Length under minimum<br>Length over maximum<br>Not ASCII chars (if not allowed)<br>Not alphabetic chars (if not allowed)<br>Empty (if not allowed) |
| Enumeration | In the list | Not in the list<br>Not specified |
| Date | In the range: (max − min)/2<br>Minimum<br>Maximum<br>With time zone (if applicable) | Under minimum<br>Over maximum<br>Wrong time zone (if applicable)<br>Wrong day<br>Wrong month<br>Wrong year<br>Wrong format<br>String |
| Time | In the range: (max − min)/2<br>Minimum<br>Maximum<br>With time zone (if applicable) | Under minimum<br>Over maximum<br>Wrong time zone (if applicable)<br>Wrong second<br>Wrong minute<br>Wrong hour<br>Wrong format<br>String |
| File (input) | Right path<br>Empty (if allowed) | Wrong path<br>Wrong permission<br>File corrupted<br>Empty (if not allowed) |
| File (output) | Right path<br>Existing file (if allowed)<br>Empty (if allowed) | Wrong path<br>Wrong permission<br>Existing file (if not allowed)<br>Empty (if not allowed) |
| From-file | Included<br>Missing (if allowed) | Missing (if not allowed)<br>Duplicated |
| Required | Specified | Missing<br>Duplicated |
| Optional | Specified<br>Missing | Duplicated |

-continued

| Property | Allowable conditions | Non-allowable conditions |
|---|---|---|
| Positional Flag | Right position<br>Specified<br>Missing (if allowed)<br>Alias (is supported) | Wrong position<br>Invalid<br>Missing (if not allowed) |

The test selector 220 also receives a parameter from a variable 230; this parameter 230 is selected by the test manager according to the desired accuracy level of the test process. Preferably, the test manager can choose the accuracy level parameter 230 among predefined values (such as a basic level, an intermediate level, a high level, and a custom level). The accuracy level parameter 230 will be used to select the allowable and/or non-allowable conditions of each property to be tested. For example, the low level involves the selection of non-boundary allowable conditions only (i.e., in the range), the intermediate level involves the selection of the allowable conditions only, the high level involves the selection of all the allowable and non-allowable conditions, and the custom level involves the selection of a desired percentage of the allowable and non-allowable conditions for specific commands. In this way, the test manager can define the extent of the test according to the contingent needs; typically, the test manager sets the low level for a Build Verification Test (BVT), the intermediate level for a Regression test, and the high level for a Component Verification Test (CVT). The proposed feature adds flexibility to the design of the test process.

The test selector 220 thus generates a scenarios matrix 235, which defines the coverage of the test process. For this purpose, the matrix 235 specifies a series of test scenarios intended to verify the correct behavior of selected features. Particularly, each scenario indicates a command and selected values of its arguments; the test scenario is identified by a unique name (such as generated by adding a different number or letter to the name of its command). The desired result is achieved by extracting (for each shell with the respective commands, as indicated in the repositories 210 and 215, respectively) the conditions to be tested (from the rule matrix 225); this operation is performed according to the selected accuracy level parameter 230. At the same time, the formal specification of each constraint (defined in the rule matrix) is resolved into its actual value, as defined in the repository 215 for the relevant argument of the corresponding command. For example, a test scenario for verifying a command requiring a single argument of the string type with the right length (such as from 0 to 10 chars) is:

| | | Argument (string) | | | | | |
|---|---|---|---|---|---|---|---|
| | | 0-10 | 0 | 10 | ... | <0 | >10 | ... |
| Test scenario | Command | X | | | | | |

The scenario matrix 235 is passed to a linker 240. The linker 240 also imports a file 245, which lists all the output messages of the CLI. Typically, each output message includes a return code (such as 0 to indicate a successful completion, or an error identifier otherwise) and a text (briefly explaining any occurred error). Moreover, the linker 240 receives another file 250, which lists a series of actions to be performed for verifying the actual successful completion of some commands; for example, when a command is used to update a record in a database, a verification action may be used to access the database and check whether the record has been updated as required. In this way, it is possible to detect errors that otherwise would be hidden by correct return codes of the commands.

The linker 240 associates each test scenario (in the scenarios matrix 235) with its expected result, as defined by an output message (extracted from the file 245) and an optional set of one or more verification actions (extracted from the file 250). For this purpose, the test manager may partition the scenarios matrix 235 into (disjoint) groups of test scenarios having the same behavior; all the test scenarios of each group are then assigned to the corresponding expected result in one shot. In this way, the operation is strongly facilitated. The associations so obtained define test cases to be executed for verifying the corresponding test scenarios, which test cases are stored into a repository 255.

A test generator 260 accesses the test cases 255. The test generator 260 uses the test cases 255 to create a test document 265. The test document 265 describes the test process in a human-readable language according to a predefined template. For example, the test document 265 starts with general information (such as its title, version, last modification, authors, index, and the like). The test document 265 then provides the description of each test case. Typically, the description of the test case includes the name of the corresponding scenario, its objective (i.e., testing the respective command), the specification of the command (i.e., opening the associated shell and launching the command with the defined arguments), and the verification of the expected result (i.e., the output message and the optional verification actions). The test document is passed to a publisher 270. The publisher 270 makes the test document 265 available to authorized persons (such as on a web site). After its formal review, the (published) test document 265 may be used for a manual execution of the test process (with the obtained documentation that is well suited to convey and/or share the desired information, and at the same time allows performing objective analyses of the test process).

In addition or in alternative, the test generator 260 also uses the test cases 255 to create an execution bucket 275. The execution bucket 275 specifies the operations to be performed (for executing the test process) in a machine-readable language, which is supported by an automation tool 280. For example, the execution bucket 275 is specified in the XML language for the STAF/STAX automation tool (including the STAX execution engine running on top of the STAF framework). The automation tool 280 provides a series of services, which can be used to automate the execution of the bucket 275, to monitor the test process and to interact with it. For this purpose, the automation engine 280 interfaces with a command line interpreter 285 implementing the CLI under test. This provides a fully automated solution that does not require any manual intervention for the execution of the test process.

Figure 3A:
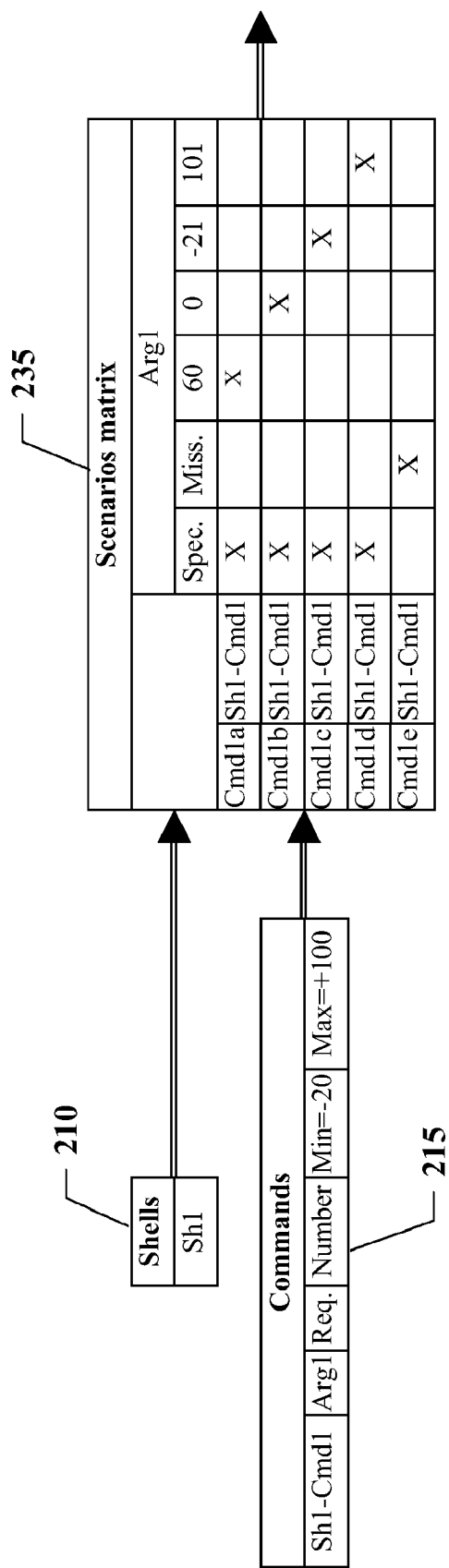
FIGS. 3a-3b illustrate an exemplary application of the solution according to an embodiment of the invention.
Figure 3B:
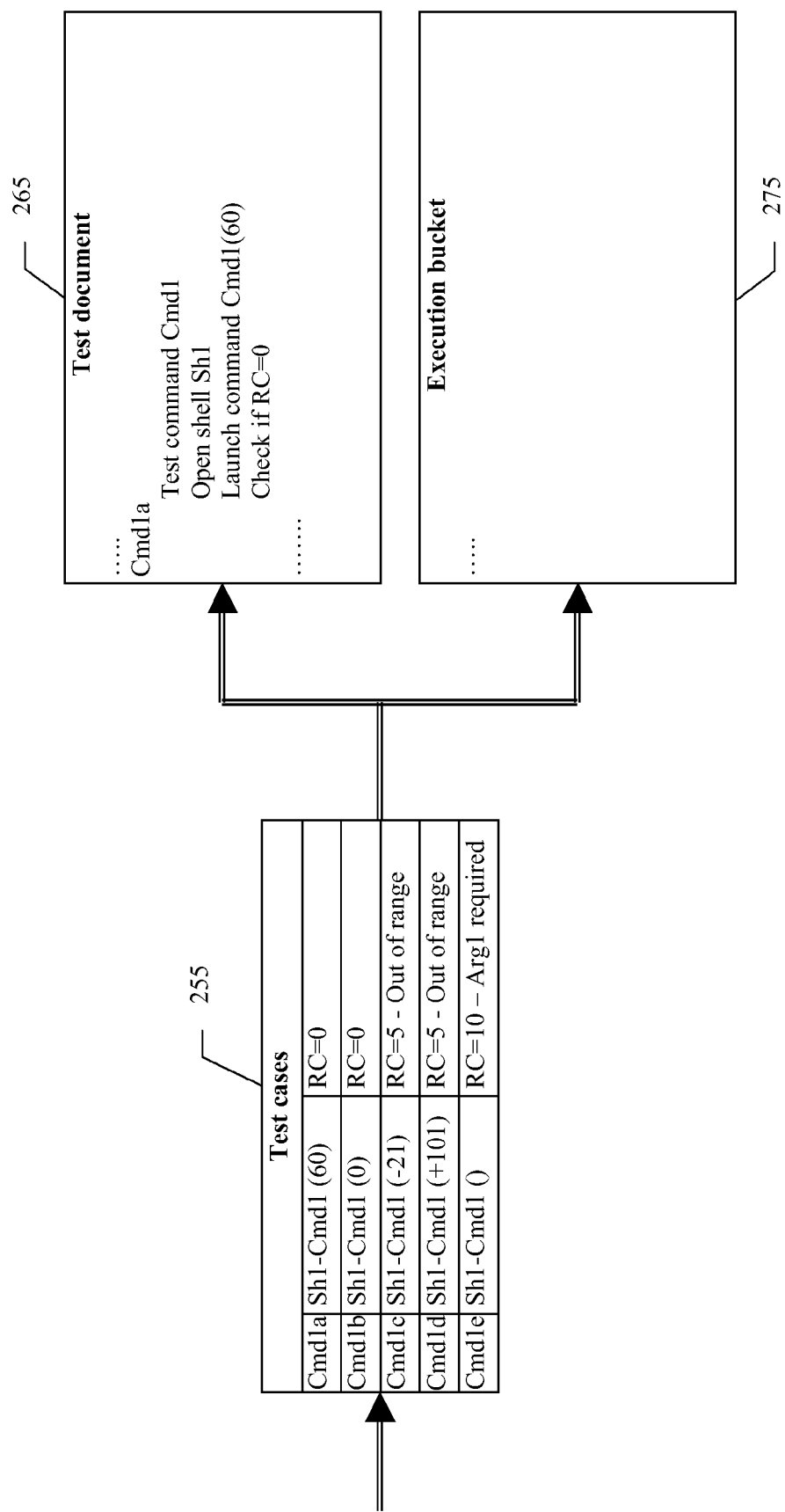

FIGS. 3a-3b illustrate an exemplary application of the above-described method to a very simple CLI. As shown in FIG. 3a, the CLI supports a shell "Sh1" (defined in the repository 210). A command "Cmd1" is to be tested in the shell "Sh1"; this command "Cmd1" is defined in the repository 215; particularly, the command "Cmd1" has a single required argument Arg1 of the number type, which ranges from a minimum=−20 and a maximum=+100. Assuming that the test manager has selected the custom value of the accuracy level parameter, this involves the selection (in the rule matrix) of the allowable condition "Specified" and the non-allowable condition "Missing" for the (option) property "Required", and the selection of the allowable conditions "In the range", "Zero" and the non-allowable conditions "Under minimum", "Over maximum" for the (data type) property "Number". The scenarios matrix 235 so obtained includes five test scenarios called "Cmd1*a*", "Cmd1*b*", "Cmd1*c*", "Cmd1*d*" and "Cmd1*e*". Each test scenario "Cmd1*a*"-"Cmd1*e*" relates to the same command "Sh1-Cmd1" for the corresponding condition (resolved according to the actual values of the constraints defined in the repository 215); for example, the test scenario "Cmd1*a*" indicates that the argument "Arg1" must have a value in the range (i.e., equal to (max-min)/2=(100+ 20)/2=60), the test scenario "Cmd1*c*" indicates that the argument "Arg1" must have a value under its minimum (i.e., <−20=−21), and the test scenario "Cmd1*d*" indicates that the argument "Arg1" must have a value over its maximum (i.e., >+100=+101).

As shown in FIG. 3*b*, the corresponding expected result is associated with each test scenario "Cmd1*a*"-"Cmd1*b*". Particularly, the test scenarios "Cmd1*a*"-"Cmd1*d*" have the same behavior, and they are assigned to the expected result defined by the return code "RC=0" (indicating the successful completion of the command "Sh1-Cmd1"). Conversely, the test scenarios "Cmd1*c*"-"Cmd1*d*" are assigned to the expected result defined by the return code "RC=5" (indicating the failure of the command "Sh1-Cmd1") and the corresponding output message "Out of range", while the test scenario "Cmd1*e*" is assigned to the expected result defined by the return code "RC=10" and the corresponding output message "Arg1 required".

It is then possible to generate the desired test document 265, with the description of the test cases (relating to the test scenarios "Cmd1*a*"-"Cmd1*e*"). For example, the test case for the test scenario "Cmd1*a*" is intended to test the command "Cmd1". This requires opening the shell "Sh1" and then launching the command "Cmd1(60)"; the test case ends by checking whether the return code is "RC=0".

At the same time, there is also generated the corresponding execution bucket 275 for the automation tool.

The proposed solution strongly facilitates the management of the test process. Indeed, the activities relating to its design and execution are (at least partially) automated. This involves a significant saving of time. Moreover, the obtained results are now less dependent on personal skills.

The devised technique is particularly advantageous to master new versions, releases or service levels of the software products.

All of the above reduces the cost and increases the quality of the test process; this fosters the extensive application of the test process, with a beneficial impact on the reliability of the software products.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computer has another structure or includes similar elements (such as a cache memory temporarily storing the programs or parts thereof to reduce the accesses to the hard disk during execution); in any case, it is possible to replace the computer with any code execution entity (such as a PDA, a mobile phone, and the like). Although in the preceding description reference has been made to a single computer for the sake of simplicity, it should be readily apparent that the proposed solution is typically applied in a data processing system with distributed architecture (for example, with web-based).

In any case, the above-described properties of the arguments must not to be interpreted in a limitative manner; likewise, the proposed allowable and non-allowable conditions are merely illustrative.

In a different embodiment of the invention, it is also possible to associate the expected results to the conditions in the rule matrix directly (thereby further automating the generation of the test cases).

Alternatively, the accuracy level parameter may be selected among different predefined values; in any case, a basic implementation of the invention that does not support this feature is contemplated.

Without departing from the principles of the invention, the CLI may support different data types and/or options (with or without any constraints).

Nothing prevents the definition of the expected results without importing any file of the output messages.

Moreover, in a different implementation of the invention, it is also possible to define the expected results only according to the output messages or to the return codes.

It should be readily apparent that the proposed format of the test document is merely illustrative.

Likewise, the execution bucket may be generated in a different language for use by any other automation tool.

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A method for testing a command line interface of a software product, the method including the steps of:
   providing a definition of a set of commands of the interface, each command requiring a set of arguments each one having a set of properties;
   providing a definition of a set of allowable conditions and non-allowable conditions of each property;
   selecting a value for an accuracy level parameter thereby setting an accuracy level, the value being one of (i) a predefined value and (ii) a custom value, the accuracy level causing a selection of a subset of conditions;

generating a set of test scenarios including the invocation of a subset of commands with the arguments thereof assigned according to selected subset of conditions, wherein assigning the arguments according to the selected subset of conditions includes selecting a particular value for a property of an argument from the set of properties corresponding to the argument;

generating a set of test cases by associating an expected result to each test scenario; and causing the execution of the test cases.

2. The method according to claim 1, wherein at least one of the properties has a set of constraints, the definition of the conditions of each property being based on a formal specification of the corresponding constraints and the definition of each command including a value of each constraint of the corresponding arguments, the method further including the step of:

resolving each formal specification in the test scenarios into the corresponding value.

3. The method according to claim 2, wherein each property includes one of a data type and a set of options, and wherein the corresponding constraints include one of an acceptable range, at least one acceptable pattern, and at least one acceptable option choice.

4. The method according to claim 1, wherein the step of generating the test cases includes:

importing a list of output messages of the interface;

partitioning the test scenarios into a plurality of disjoint groups; and assigning one of the output messages to each group of test scenarios.

5. The method according to claim 1, wherein the step of generating the test cases includes, for at least one of the test scenarios:

specifying a list of actions for verifying a successful completion of the test scenario.

6. The method according to claim 1, wherein the step of causing the execution of the test cases includes:

generating a machine-readable definition of the test cases in a language supported by an automation tool; and executing the test cases by the automation tool under the control of the machine-readable definition.

7. The method according to claim 1, wherein the step of causing the execution of the test cases includes:

generating a human-readable definition of the test cases; and publishing the human-readable definition.

8. A computer program product in a computer-usable non-transitory storage medium, the computer program when executed on a data processing system causing the system to perform a method for testing a command line interface of a software product, wherein the method includes the steps of:

providing a definition of a set of commands of the interface, each command requiring a set of arguments each one having a set of properties;

providing a definition of a set of allowable conditions and non-allowable conditions of each property;

selecting a value for an accuracy level parameter thereby setting an accuracy level, the value being one of (i) a predefined value and (ii) a custom value, the accuracy level causing a selection of a subset of conditions;

generating a set of test scenarios including the invocation of a subset of commands with the arguments thereof assigned according to selected subset of conditions, wherein assigning the arguments according to the selected subset of conditions includes selecting a particular value for a property of an argument from the set of properties corresponding to the argument;

generating a set of test cases by associating an expected result to each test scenario; and causing the execution of the test cases.

9. A system for testing a command line interface of a software product, the system including:

a storage device including a storage medium, wherein the storage device stores computer usable program code; and a processor, wherein the processor executes the computer usable program code, and wherein the computer usable program code comprises:

computer usable code for providing a definition of a set of commands of the interface, each command requiring a set of arguments each one having a set of properties;

computer usable code for providing a definition of a set of allowable conditions and non-allowable conditions of each property;

computer usable code for selecting a value for an accuracy level parameter thereby setting an accuracy level, the value being one of (i) a predefined value and (ii) a custom value, the accuracy level causing a selection of a subset of conditions;

computer usable code for generating a set of test scenarios including the invocation of a subset of commands with the arguments thereof assigned according to selected subset of conditions, wherein assigning the arguments according to the selected subset of conditions includes selecting a particular value for a property of an argument from the set of properties corresponding to the argument;

computer usable code for generating a set of test cases by associating an expected result to each test scenario; and computer usable code for causing the execution of the test cases.

10. The computer program product according to claim 8, further including a rule matrix, the rule matrix providing, for a command in the set of commands, a value of a parameter in the set of parameters of an argument in the set of arguments of the command, the value of the parameter corresponding to a condition in the set of allowable conditions and non-allowable conditions.

11. The computer program product according to claim 8, wherein at least one of the properties has a set of constraints, the definition of the conditions of each property being based on a formal specification of the corresponding constraints and the definition of each command including a value of each constraint of the corresponding arguments, the method further including the step of:

resolving each formal specification in the test scenarios into the corresponding value.

12. The computer program product according to claim 11, wherein each property includes one of a data type and a set of options, and wherein the corresponding constraints include one of an acceptable range, at least one acceptable pattern, and at least one acceptable option choice.

13. The computer program product according to claim 8, wherein the step of generating the test cases includes:

importing a list of output messages of the interface;

partitioning the test scenarios into a plurality of disjoint groups; and assigning one of the output messages to each group of test scenarios.

14. The computer program product according to claim 8, wherein the step of generating the test cases includes, for at least one of the test scenarios:

specifying a list of actions for verifying a successful completion of the test scenario.

15. The computer program product according to claim 8, wherein the step of causing the execution of the test cases includes:

generating a machine-readable definition of the test cases in a language supported by an automation tool; and executing the test cases by the automation tool under the control of the machine-readable definition.

16. The computer program product according to claim 8, wherein the step of causing the execution of the test cases includes:

generating a human-readable definition of the test cases; and publishing the human-readable definition.

17. The method according to claim 1, further including a rule matrix, the rule matrix providing, for a command in the set of commands, a value of a parameter in the set of parameters of an argument in the set of arguments of the command, the value of the parameter corresponding to a condition in the set of allowable conditions and non-allowable conditions.

* * * * *